United States Patent
Fukui et al.

(10) Patent No.: US 9,946,008 B2
(45) Date of Patent: Apr. 17, 2018

(54) INDICATION LIGHTING DEVICE AND VACUUM CLEANER INCLUDING THE SAME

(71) Applicant: Panasonic Intellectual Property Management Co., Ltd., Osaka (JP)

(72) Inventors: Atsushi Fukui, Osaka (JP); Masaru Fujita, Osaka (JP); Tomohisa Sakaguchi, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 182 days.

(21) Appl. No.: 14/885,591

(22) Filed: Oct. 16, 2015

(65) Prior Publication Data

US 2016/0209575 A1 Jul. 21, 2016

(30) Foreign Application Priority Data

Jan. 20, 2015 (JP) ................................ 2015-008193

(51) Int. Cl.
*F21V 8/00* (2006.01)
*F21V 33/00* (2006.01)
(Continued)

(52) U.S. Cl.
CPC ............ *G02B 6/0036* (2013.01); *A47L 9/244* (2013.01); *A47L 9/281* (2013.01); *A47L 9/2857* (2013.01);
(Continued)

(58) Field of Classification Search
CPC ................................ A47L 9/30; F21V 33/0044
See application file for complete search history.

(56) References Cited

U.S. PATENT DOCUMENTS 5,207,498 A * 5/1993 Lawrence ............ A47L 9/2847
15/324
5,301,385 A 4/1994 Abe et al.
(Continued)

FOREIGN PATENT DOCUMENTS

CN 102829390 A 12/2012
DE 1112202 B * 8/1961 ................ F21L 4/00
(Continued)

OTHER PUBLICATIONS

Machine translation of DE 1112202 B retrieved from Espacenet.*
English Translation of Chinese Search Report dated Dec. 4, 2017 for the related Chinese Patent Application No. 201510958615.X.

*Primary Examiner* — Jong-Suk (James) Lee
*Assistant Examiner* — Colin Cattanach
(74) *Attorney, Agent, or Firm* — Panasonic IP Management; Kerry S. Culpepper

(57) ABSTRACT

An indication lighting device provided is capable of reducing the number of electric wiring from a fixed, part to a moving part when an indication part is provided in the moving part's side. The indication lighting device makes indication by emitting light from a light source arranged in a fixed part to an optical waveguide arranged in a moving part, reflecting the light incident on the optical waveguide by reflection surfaces of prisms of the optical waveguide to an indication part provided in a tip side of the optical waveguide to be propagated, and emitting the light propagated inside the optical waveguide through the indication part.

1 Claim, 15 Drawing Sheets

(51) Int. Cl.
- *A47L 9/28* (2006.01)
- *A47L 9/24* (2006.01)
- *A47L 9/30* (2006.01)
- *A47L 5/00* (2006.01)

(52) U.S. Cl.
CPC .............. *G02B 6/0031* (2013.01); *A47L 5/00* (2013.01); *A47L 9/30* (2013.01); *F21V 33/0044* (2013.01)

(56) References Cited

U.S. PATENT DOCUMENTS

| | | | | |
|---|---|---|---|---|
| 5,428,468 | A | 6/1995 | Zimmerman et al. | |
| 5,983,443 | A * | 11/1999 | Redding | A47L 9/30 15/324 |
| 6,237,962 | B1 * | 5/2001 | Lim | A47L 9/244 285/303 |
| 7,300,172 | B1 * | 11/2007 | Lefler | A47L 9/2836 362/191 |
| 7,331,083 | B2 * | 2/2008 | Overvaag | A47L 9/248 15/324 |
| 8,516,653 | B2 * | 8/2013 | Cunningham | A47L 9/281 15/339 |
| 2004/0090765 | A1 * | 5/2004 | Yu | G02B 6/0036 362/620 |
| 2006/0096057 | A1 * | 5/2006 | Chatfield | A47L 9/02 15/324 |
| 2007/0240275 | A1 * | 10/2007 | Willenbring | A47L 9/2805 15/324 |
| 2009/0310350 | A1 * | 12/2009 | Dalton | B29C 70/585 362/235 |
| 2010/0110720 | A1 * | 5/2010 | Cennini | G02B 6/0038 362/554 |
| 2010/0296264 | A1 * | 11/2010 | Ronda | F21S 6/003 362/84 |
| 2012/0047679 | A1 * | 3/2012 | Peng | A47L 9/248 15/339 |
| 2012/0320310 | A1 | 12/2012 | Adachi et al. | |
| 2013/0320858 | A1 * | 12/2013 | Deery | A47L 9/30 315/129 |
| 2014/0355297 | A1 * | 12/2014 | Castillo | G02B 6/0035 362/582 |
| 2014/0355302 | A1 * | 12/2014 | Wilcox | G02B 6/0031 362/609 |
| 2015/0138763 | A1 * | 5/2015 | Bennett | F21L 4/027 362/208 |
| 2015/0285983 | A1 * | 10/2015 | Santoro | G02B 6/0038 362/611 |

FOREIGN PATENT DOCUMENTS

| | | | | |
|---|---|---|---|---|
| DE | 009107002 U1 * | 7/1991 | | A47L 9/30 |
| JP | 4752662 B | 8/2011 | | |

* cited by examiner

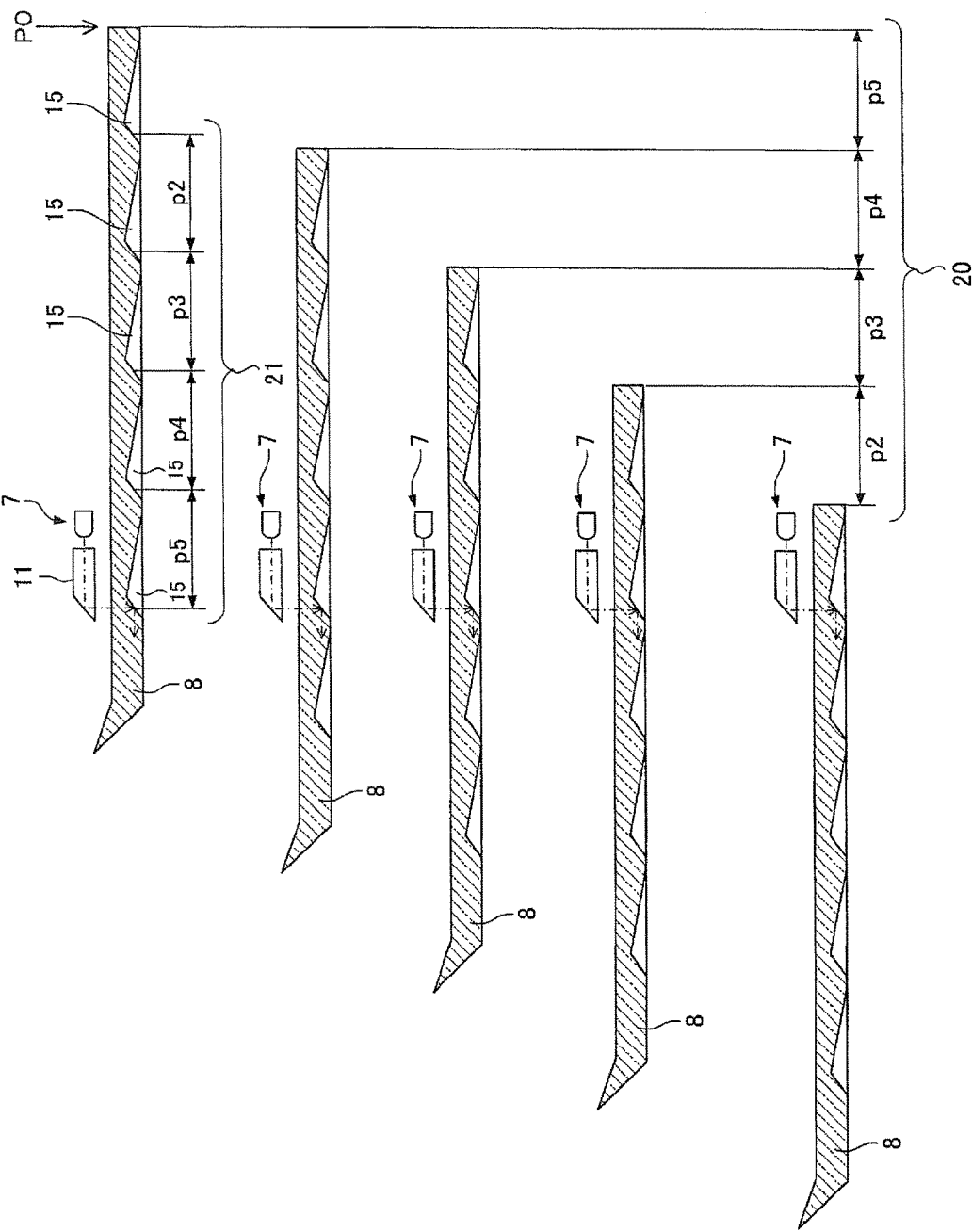

RELATED ART

INDICATION LIGHTING DEVICE AND VACUUM CLEANER INCLUDING THE SAME

TECHNICAL FIELD

The technical field relates to an indication lighting device assembled to electric appliances having a mechanism portion in which a moving part can be locked in plural stop positions with respect to a fixed part.

BACKGROUND

As an example of electric appliances having the mechanism portion in which the moving part can be locked in plural stop positions with respect to the fixed part, a vacuum cleaner can be cited. A vacuum cleaner shown in FIG. 16 is described in Japanese Patent No. 4752662 (Patent Document 1).

A cleaner main body 1 is provided with a motor which generates a force of sucking dust and dirt. The cleaner main body 1 and a suction nozzle 6 are connected through a flexible hollow hose 2 and an extension tube including a fixed part casing 4 and a moving part casing 5. The fixed part casing 4 and the moving part casing 5 are hollow, transmitting the suction force of the cleaner main body 1 to the suction nozzle 6 and sucking the dust and dirt from the suction nozzle 6.

In a hand operation part 3 provided in at a tip of the hose 2, switches and an indication part for a power source and for performing various kinds of operations are arranged.

A drawing length of the moving part casing 5 from the fixed part casing 4 is configured to be locked at plural stop positions so that a user can adjust the length between the hand operation part 3 held by the user and the suction nozzle 6 at the time of cleaning. Part of the moving part casing 5 is housed inside the fixed part casing 4 when the length is shortened, and the moving part casing 5 is drawn out from the fixed part casing 4 when the length is extended.

Moreover, an indication device 35 including a light source is provided in the vicinity of a tip of the moving part casing 5. The indication device 35 informs the user that dust and dirt are detected by a not-shown detector. By arranging the indication device 35 is arranged in the moving part casing 5, the user can see indication contents easily while cleaning.

SUMMARY

In the related-art indication device 35, it is necessary to lay a wiring material from the fixed part casing 4 to the light source of the indication device 35 arranged in the moving part casing 5. In order to improve operability, weight reduction is required. Weight reduction can be achieved by thinning down the fixed part casing 4 and the moving part casing 5 as much as possible. On the other hand, in order to prevent disconnection due to the bending of the wiring material caused by changing the stop position of the moving part casing 5, it is necessary to increase the width of wiring for relaxing bending stress and to use a thin and flexible wiring material. When the wiring width of electric wiring to the moving part casing 5 is increased, there is a problem that it is difficult to reduce weight of the vacuum cleaner.

Accordingly, an indication lighting device capable of making indication even when the number of electric wiring is reduced and having a reduced width of the electric wiring material by transmitting light emitted from a light source arranged in a fixed part to an indication part in a moving part is provided.

According to an embodiment, there is provided an indication lighting device making indication by emitting light from a moving part having plural locating positions with respect to a fixed part, which includes a light source arranged in the fixed part and emitting light, an optical waveguide arranged in the moving part and propagating the light emitted from the light source and an indication part arranged in the moving part and emitting the light propagated inside the optical waveguide, in which the optical waveguide has plural prisms in which reflection surfaces are formed at intervals corresponding to intervals of location, and the light emitted from the light source is reflected on the reflection surfaces of the optical waveguide at respective locating positions of the moving part to be propagated toward the indication part and emitted from the display part to make indication.

In the indication lighting device according to the embodiment, the light emitted from the light source arranged in the fixed part is propagated to the indication part provided in the moving part through the optical waveguide and can be emitted from the indication part. As plural prisms are formed in the optical waveguide, the light emitted from the light source can be propagated to the indication part and can be emitted from the indication part even in a state where the moving part is located at any of plural locating positions.

According to the above, the number of electric wire from the fixed part to the moving part can be reduced and the width of the electric wiring material can be reduced to thereby thin down the fixed part and the moving part, which can contribute to reduction in weight of the fixed part and the moving part and improvement in operability.

In the vacuum cleaner using the indication lighting device according to the present invention, the weight can be reduced by thinning down the fixed part of the extension tube and the moving part of the extension tube.

BRIEF DESCRIPTION OF THE DRAWINGS

FIG. 7 is an explanatory view for the light guide plate and the light source unit in a state where the locating position of the moving part casing is moved according to the embodiment;

DESCRIPTION OF EMBODIMENTS

Hereinafter, an indication lighting device according to an embodiment will be explained.

Figure 15:
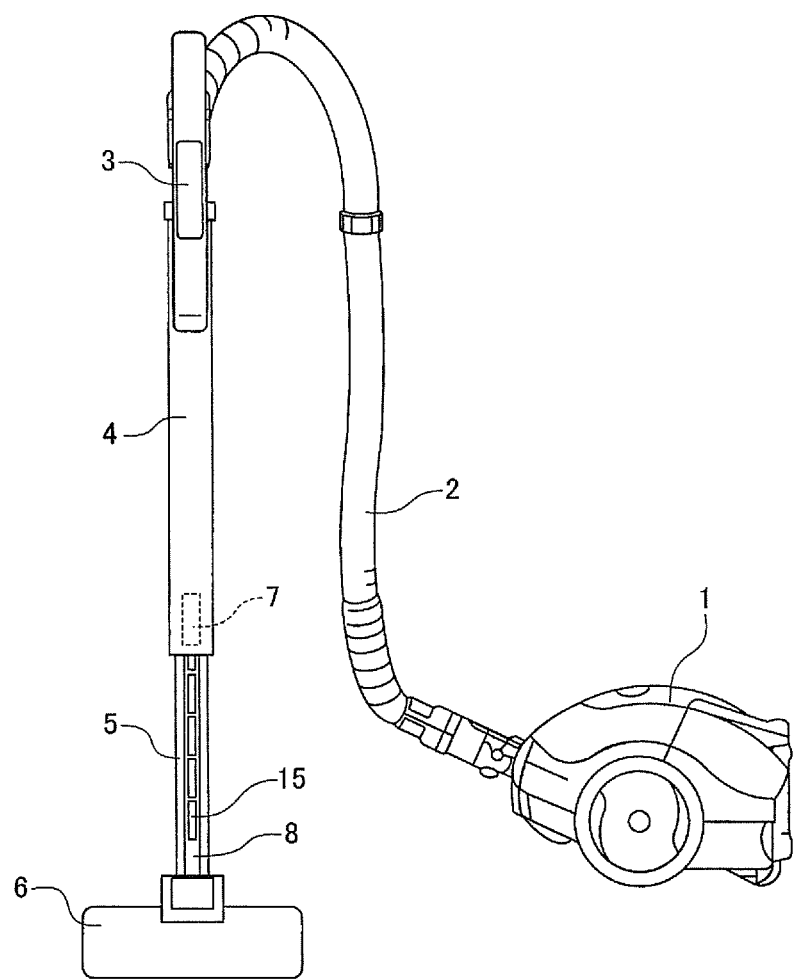
FIG. 15 is a perspective view of a vacuum cleaner in which, the indication lighting device according to the present embodiment is arranged.

FIG. 15 shows a vacuum cleaner having the indication lighting device according to the present embodiment.

Figure 16:
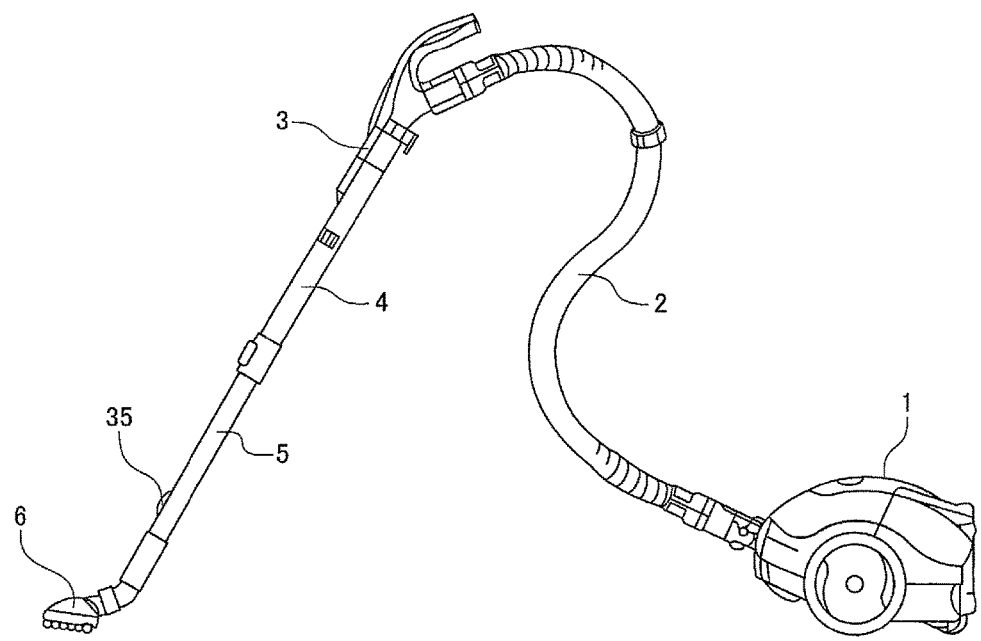
FIG. 16 is a perspective view of a vacuum cleaner including a related-art indication lighting device.

The explanation will be made by using the same symbols for the same components as those of FIG. 16.

The vacuum cleaner generates a suction, force by a motor in the cleaner main body 1 and sucks dust and dirt through hollow portions connected in series in a hand operation part 3 at a tip of a hose 2 connected to the cleaner main body 1, a fixed part casing 4 which is the extension tube as the fixed part, a moving part casing 5 which is the extension tube as the moving part and a suction nozzle 6.

The fixed part casing 4 and the moving part casing 5 are formed of an opaque material. A light source unit 7 is arranged in the vicinity of a tip of the fixed part casing 4. The light source unit 7 emits light based on a result detected by a not-shown detector which detects dust and dirt.

The moving part casing 5 is configured to slide so as to extend and retract freely and further configured to be locked and located at plural extended and retracted positions with respect to the fixed part casing 4. A light guide plate 8 as an optical waveguide is arranged in the moving part casing 5. Moreover, a light emitting window 9 as an indication part is formed at a tip of the moving part casing 5 on a surface of the light guide plate 8 in a Z-axis direction.

The light emitting window 9 is formed of a transparent material, which transmits and diffuses light emitted from a tip of the light guide plate 8 and emits light with good visibility to inform a state of dust and dirt to be sucked during cleansing.

Figure 1A:
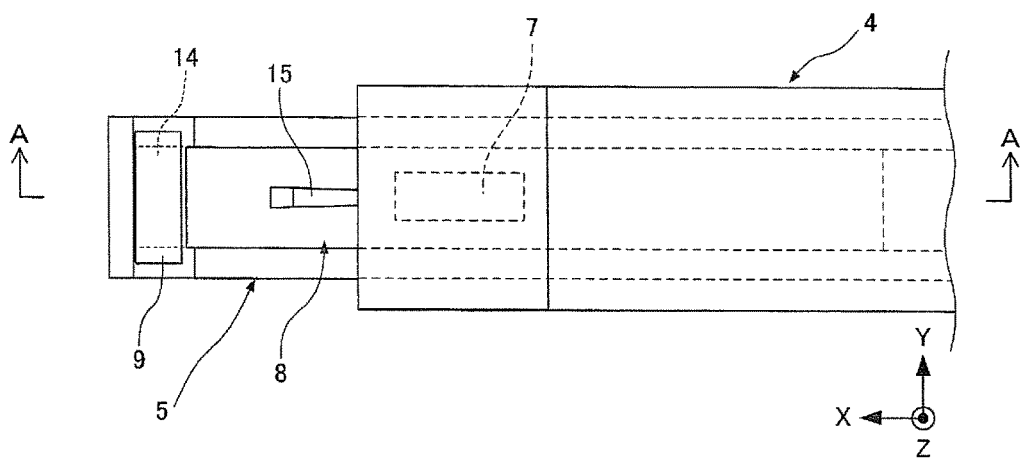
FIG. 1A is a plan view of an indication lighting device according to an embodiment.
Figure 1B:
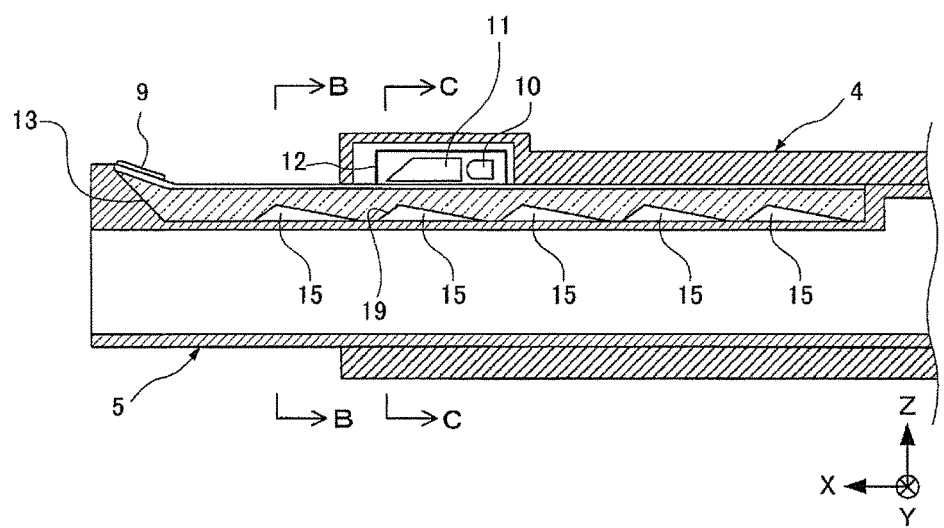
FIG. 1B is an A-A cross section.

The indication lighting device is configured as shown in FIG. 1A and FIG. 1B.

In FIG. 1A, a direction in which the moving part extends (left direction in the page space) is set as an X-axis, an upper direction of the page space is set as a Y-axis and a light emitting surface (front direction in the page space) is set as a Z-axis direction. FIG. 1B shows an X-Z cross section taken along A-A of FIG. 1A.

The light source unit 7 provided in the fixed part casing 4 includes a light source 10, a reflection block 11 and a light shielding cover 12 covering the two, which is formed of a black material and the like absorbing light for reducing leakage of light. The light source 10 is, for example, a shell-type light emitting diode with a lens (hereinafter, the light emitting diode is abbreviated as LED) which emits incoherent light with high directivity an optical axis of which is the X-axis direction. The reflection block 11, which changes an optical path of light emitted from the light source 10 and incident on the reflection block 11 from being propagated in the X-axis direction to the Z-axis direction, is formed of a transparent resin material such as polycarbonate, acrylic, PET and epoxy. The reflection block 11 is arranged in parallel to an X-Y plane, and both surfaces in the Z-axis direction are approximately parallel to each other. The optical axis of the light source 10 and a moving direction of the moving part casing 5 are also parallel or approximately parallel to each other.

The light guide plate 8 arranged in the moving part casing 5 is formed of a transparent resin such as polycarbonate, acrylic, PET and epoxy. The light guide plate 8 has a rectangular parallelepiped shape in which a cross section in a Y-Z plane is a rectangular shape, both surfaces in the Z-axis direction are approximately parallel to each other and both surfaces in the Y-axis direction are approximately parallel to each other, and a prism array 13 and a tip inclined surface 14 are formed in a tip thereof in the X-axis positive direction. On a lower surface of the light guide plate 8, namely, the surface in the Z-axis negative direction, plural prisms 15 are formed, by concave portions engraved on the lower surface of the light guide plate 8. The plural prisms 15 are formed in the light guide plate 8 at intervals corresponding to locating positions of the moving part casing 5.

Figure 2A:
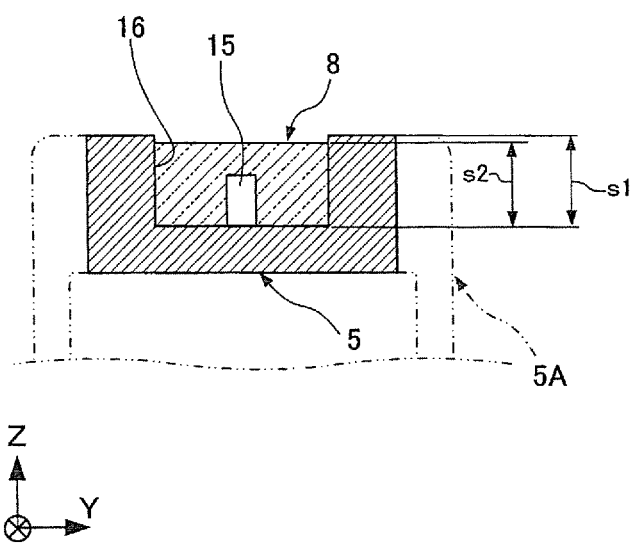
FIG. 2A is a schematic view of a B-B cross section of FIG. 1
Figure 2B:
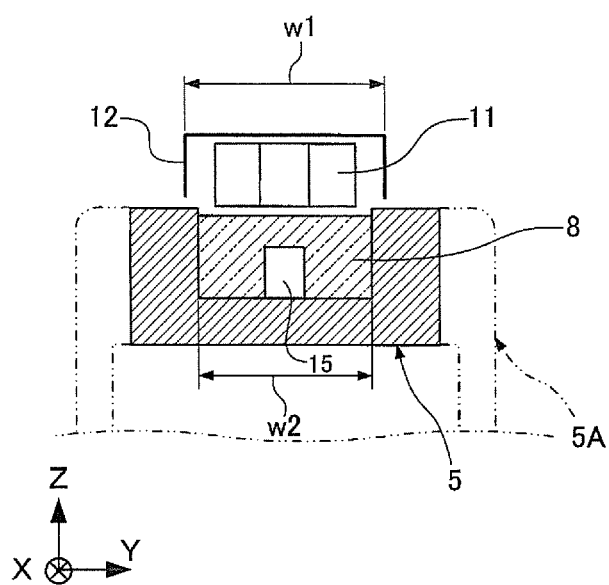
FIG. 2B is a schematic view of a C-C cross section of FIG. 1.

FIG. 2A is a schematic view showing a Y-Z cross section taken along B-B of FIG. 1B and FIG. 2B is a schematic view showing a Y-Z cross section taken along C-C of FIG. 1B. As the fixed part casing 4 and the moving part casing 5 have a tubular shape, the Y-Z cross section taken along B-B in the moving part casing 5 has a tubular shape as shown by a virtual line 5A in FIG. 2A, however, the cross section is schematically shown for explaining the indication lighting device by attaching importance to the propagation of light. Specifically, the shape of the moving part casing 5 is shown as an equilateral channel provided with a groove 16 in which the light guide plate 8 is arranged.

As shown in FIG. 2A, the prisms 15 are formed by forming triangular concave portions with an adequate depth in the center on the bottom of the light guide plate 8. A height "s1" of a portion of the moving part casing 5 where the light guide plate 8 is arranged is formed to be higher than a thickness "s2" of the light guide plate 8. That is, "s1">"s2". As a surface of the light guide plate 8 in the Z-axis positive direction is lower than the moving part casing 5, the surface of the light guide plate 8 becomes scratch resistant.

As shown in FIG. 2B, a width "w1" of the light shielding cover 12 of the light source unit 7 is formed to be wider than a width "w2" of the light guide plate 8 in the emitting surface side for preventing the moving part casing 5 from being irradiated directly with emitted light from the reflection block 11 which is reflected on the light guide plate 8 and for preventing leakage of light from the moving part casing 5. That is, "w1">"w2".

Figure 3A:
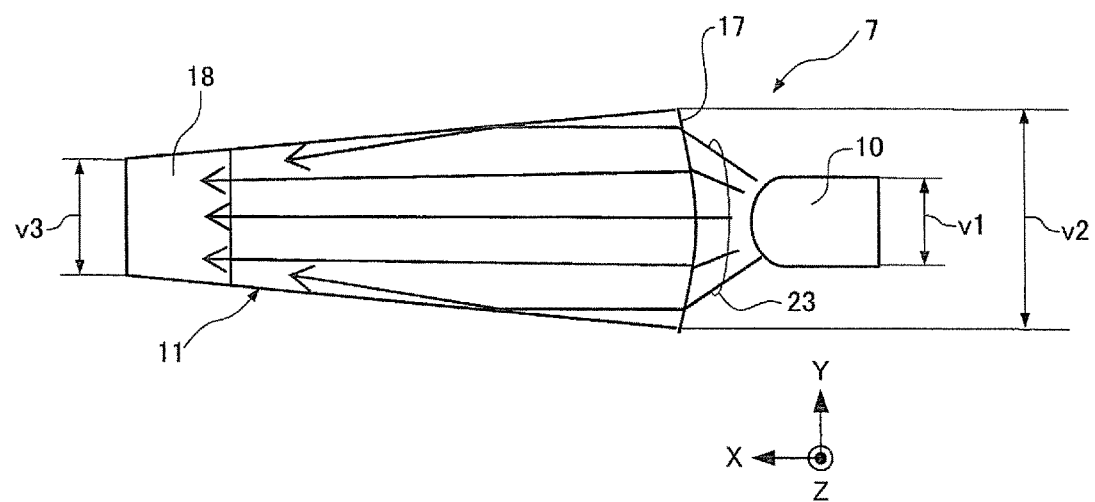
FIG. 3A is a plan view of a light source unit and FIG. 3B is an enlarged side view of the light source unit according to the embodiment.
Figure 3B:
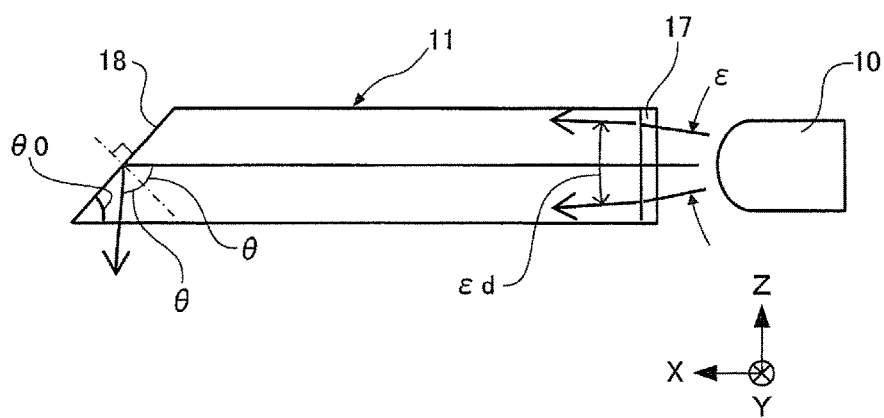

FIG. 3A is a view of the light source 10 and the reflection block 11 of the light source unit 7 seen from the Z-axis direction and FIG. 3B is a view seen from the Y-axis direction. A shape of an incident surface 17 formed in the light source 10 side of the reflection block 11 is formed to be an anamorphic curved surface in which the curvature differs in the Z-axis direction and in the Y-axis direction. As the shape which is thin in the Z-axis direction and is wide in the Y-axis direction for reducing the thickness of the reflection block 11 is adopted, the optimum curvature differs in respective curved surfaces, therefore, two-axis anamorphic curved surface is used.

The light incident on the reflection block 11 from the light source 10 is emitted in the Z-axis negative direction by a total reflection surface 18 formed at an end face of the reflection block 11 in the X-axis positive direction to be incident on the light guide plate 8. An angle of the total reflection surface 18 is $\theta 0$ with respect to a lower surface of the reflection block 11, namely, the surface in the Z-axis negative direction.

A diverging total angle of light from the light source 10 is represented by "$\epsilon$". The diverging total angle of light "$\epsilon d$" obtained when emitted light from the light source 10 is incident on the reflection block 11 is represented by $\epsilon d = 2 \times \arcsin[\{\sin(\epsilon/2)\}/n]$ when a reflective index of the reflection block 11 is "n" according to Snell's law. Here, "arcsin" is an inverse function of a sine function.

When an angle made by a plane normal of the total reflection surface 18 and the optical axis of the light source 10, namely, the X-axis is $\varphi$, an angle $\varphi L$ at which light is totally reflected at the total reflection surface 18 is given by $\varphi L = \arcsin\{1/n\}$ according to Snell's law. When the incident angle with respect to the total reflection surface is larger than the total reflection angle, the reflection with the reflectance 100% can be obtained on the total reflection surface. That is, $\varphi > \varphi L$.

As the diverging angle of a light ray inside the reflection block 11 is "$\epsilon d$", the smallest angle with respect to the plane normal of the total reflection surface 18 is represented by $\varphi - \epsilon d/2$. In order to reflect light inside the reflection block 11 at total reflection, $\varphi - \epsilon d/2$ is set to be larger than the angle $\varphi L$ as the total reflection condition. That is, $\varphi - \epsilon d/2 > \varphi L$. The relation between an inclination angle $\theta 0$ of the total reflection surface 18 and "$\varphi$" is represented by $\theta 0 + \varphi = 90°$, therefore, the inclination angle $\theta 0$ of the total reflection surface 18 is preferably $$\theta 0 < 90° - \epsilon d/2 - \varphi L$$

For example, when a resin refractive index of the reflection block 11 is n:1.49, the diverging angle of the light source is $\epsilon$:18°, $\varphi L = 42.2°$, $\epsilon d = 12°$ and $\theta 0 < 41.8°$. It is preferable that the inclination angle $\theta 0$ of the total reflection surface 18 of the reflection block 11 is 41.8° or less. At this time, $\varphi > 48.2°$ and the emitted light from the reflection block 11 is $2 \times \varphi = 96.4°$ with respect to the optical axis of the light source 10, namely, the X axis, which will be a light ray in the Z-axis negative direction slightly inclined to the X-axis direction.

A width "v2" of the incident surface 17 of the reflection block 11 is set to be wider than a width "v1" of the light source 10 for allowing much emitted light from the light source 10 to be incident. That is, "v2">"v1". In the total reflection surface 18 of the reflection block 11, a width "v3" of the total reflection surface 18 is set to be narrower than the width "v2" of the incident surface 17 for reducing the width of the emitted light to the light guide plate 8 as thin as possible. That is, "v3"<"v2". Both surfaces of the reflection block 11 in the Z-axis direction are formed to be approximately parallel to the light guide plate 8 for guiding the incident light of the light source 10 to the total reflection surface 18 at the tip by the total reflection.

Figure 4A:
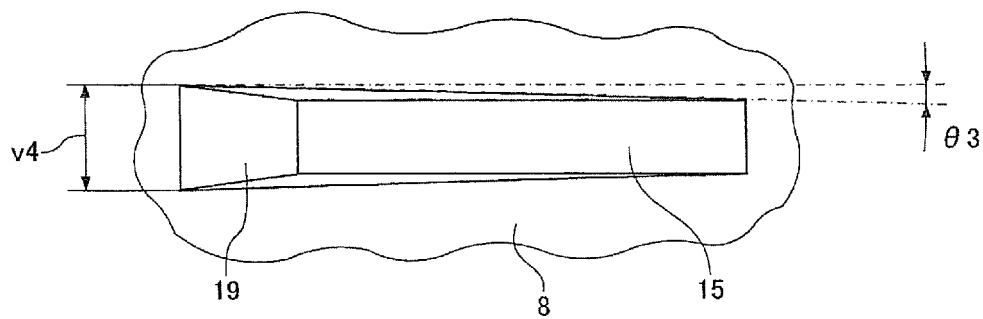
FIG. 4A is an enlarged plan view of a portion of a prism in a light guide plate.
Figure 4B:
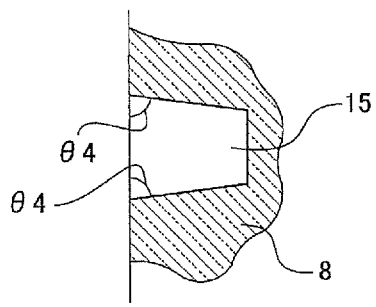
FIG. 4B is an enlarged front view of a portion of the prisms in the light guide plate and FIG. 4C is an enlarged side view of a portion of the prism in the light guide plate according to the embodiment.
Figure 4C:
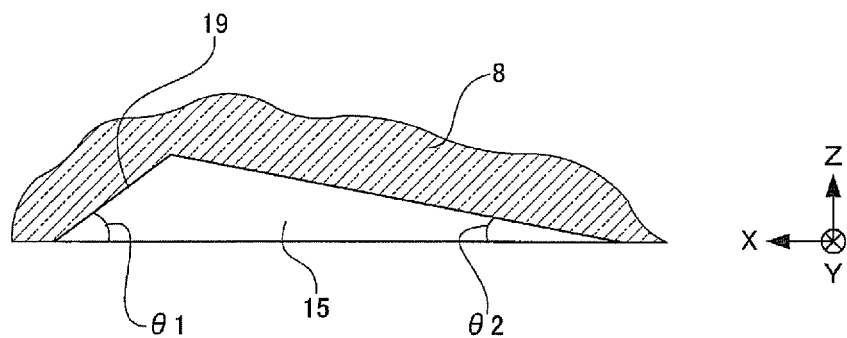

FIG. 4A is a view of the prism 15 of the light guide plate 8 seen from the Z-axis direction, FIG. 4B is a view seen from the Y-axis direction and FIG. 4C is a view seen from the X-axis direction.

A width "v4" of the prism 15 is formed to be smaller than the width of the light guide plate 8. The plural prisms 15 are formed inside the light guide plate 8 as shown in FIG. 1, and total reflection surfaces 19 of the plural prisms 15 are formed so that the area of the total reflection surfaces 19 becomes smaller as coordinate values of the plural prisms 15 in the X-axis positive direction are increased. The total reflection surface 19 of the prism 15 is positioned slightly forward of the total reflection surface 18 in the reflection block 11, namely, in the X-axis positive direction at each position located by sliding the moving part casing 5 in the fixed part casing 4 shown in FIG. 1A and FIG. 1B. Both surfaces of the prism 15 in the Y-axis direction are formed with an angle $\theta 3$ so that the width is slightly reduced toward the X-axis negative direction. That is, $\theta 3 > 0$.

In order to increase the light transmission efficiency from the reflection block 11 to the light guide plate 8, the width "v3" of the total reflection surface 18 in FIG. 3A is formed to be narrower than the width "v4" of the total reflection surface 19 of the prism 15 of FIG. 4A at a position where the moving part casing 5 extends to the maximum length. That is, "v4">"v3".

In FIG. 4B, the prism 15 is formed with an angle $\theta 4$ with respect to a bottom surface of the light guide plate 8 in the Z-axis negative direction so that the width is reduced toward the Z-axis direction. $\theta 4$ is approximately 89° or less, which is the inclination for allowing a molded member to be pulled out easily from a die during molding.

When an angle made by the total reflection surface 19 and the bottom surface of the light guide plate 8, namely, the surface in the Z-axis negative direction is $\theta 1$, $\theta 1 \approx \theta 0$. That is, the total reflection surface 18 of the reflection block 11 and the total reflection surface 19 of the prism 15 are arranged so as to be approximately parallel to each other.

When an angle made by an slope opposite to the total reflection surface 19 of the prism 15 and the bottom surface of the light guide plate 8 is $\theta 2$, $\theta 2$ is set to be sufficiently small so as not to interfere with the propagation of light inside the light guide plate 8, which is at least $\theta 2 < \theta 1$.

Figure 5A:
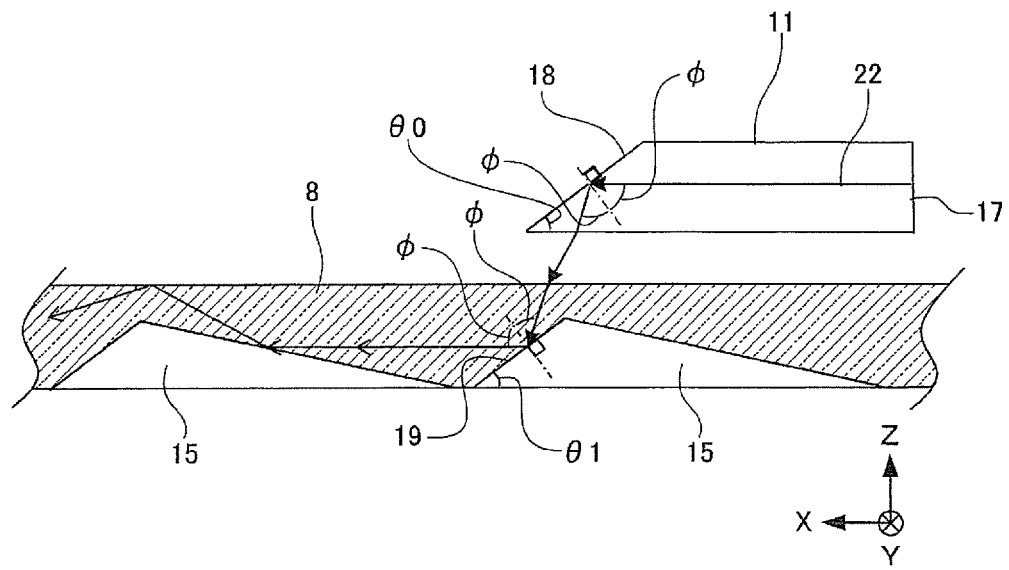
FIG. 5A is an enlarged cross-sectional view showing an optical path from a reflection block to the light guide plate and FIG. 5B is an enlarged plan view showing the optical path from the reflection block to the light guide plate according to the embodiment.
Figure 5B:
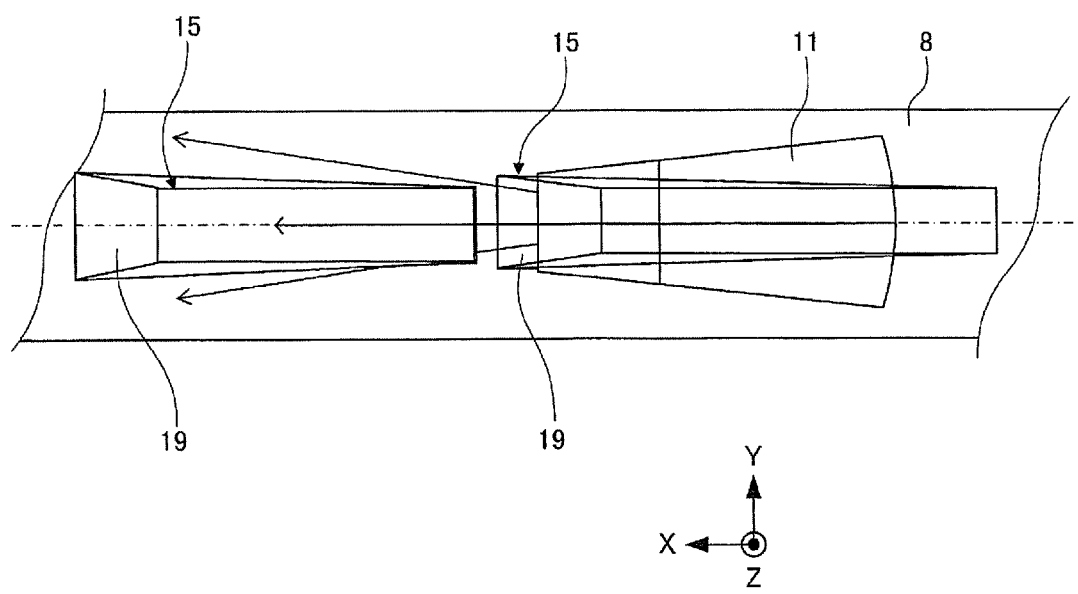

FIG. 5A shows a positional relationship between the reflection block 11 and an X-Z cross section of the light guide plate 8 in a state where the moving part casing 5 and the light guide plate 8 are located at respective locating positions. FIG. 5B is a view of the state where the moving part casing 5 and the light guide plate 8 are located at respective locating positions which is seen from the Z-axis direction. The central position of the total reflection surface 19 of the prism 15 in the light guide plate 8 is arranged so as to be slightly shifted in the X-axis direction with respect to the central position of the total reflection surface 18 of the reflection block 11.

Figure 6A:
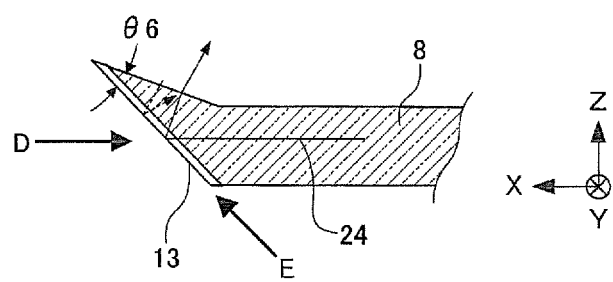
FIG. 6A is a cross-sectional view showing a tip portion of the light guide plate.
Figure 6B:
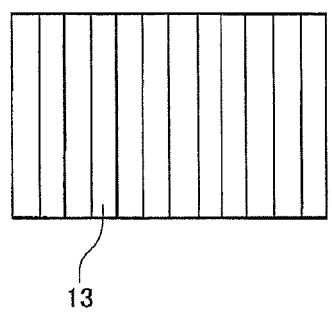
FIG. 6B is a view seen from an arrow D, which shows the tip portion of the light guide plate.
Figure 6C:
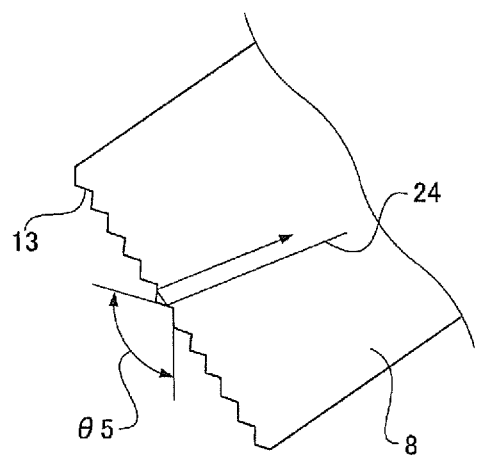
FIG. 6C is a view seen from an arrow E, which shows the tip portion of the light guide plate

A tip shape of the light guide plate 8 in the X-axis positive direction is shown in FIG. 6A. FIG. 6B is a view seen from an arrow D of FIG. 6A, FIG. 6C is a view seen from an arrow E of FIG. 6A. The prism array 13 formed in the tip of the light guide plate 8 in the X-axis direction is formed to be inclined in the X-Z cross section of the light guide plate 8. The prism array 13 is configured so that prisms with an apex angle θ5 of approximately 90° are arranged, having a function of returning light incident as shown in FIG. 6C to the original direction. The tip inclined surface 14 formed in the tip of the light guide plate 8 in the X-axis direction is inclined to a direction in which an angle θ6 made by the inclined surface 14 and the prism array 13 is decreased.

The relations between the light guide plate 8 and the light source unit 7 when moving the moving part casing 5 of FIG. 1 to respective locating positions of the fixed part casing 4 is shown in FIG. 7. In this example, movement intervals 20 of the light guide plate 8 when the moving part casing 5 is moved to respective locating positions from a reference point P0 of the fixed part casing 4 in the X-axis direction are intervals p5, p4, p3 and p2 in the X-axis direction, and arrangement intervals 21 of five prisms 15 provided in the light guide plate 8 are set so that distance between centers of the total reflection surfaces 19 of the prisms 15 are the same as the movement intervals p5, p4, p3 and p2 toward the X-axis negative direction. Accordingly, when the moving part casing 5 is moved from the fixed part casing 4 to the locating positions at intervals p5, p4, p3 and p2, a light ray 22 emitted from the light source unit 7 can be incident on the total reflection surface 19 of the prism 15 positioned under the light source unit 7.

The structure of the indication lighting device will be explained in more detail based on operations.

As shown in FIG. 3A and FIG. 3B, a light ray 23 with high directivity is emitted from, the light source 10 in the X-axis direction and is incident on the incident surface 17 of the reflection block 11. The reflection block 11 is formed so that the height in the Z-axis direction is low and the height in the Y-axis direction is slightly higher for reducing the height in the Z-axis direction. The incident surface 17 is formed to be the anamorphic surface in which the curvature differs in the Z-axis direction and in the Y-axis direction, and the optimum curvatures are respectively set in the Z-axis direction and in the Y-axis direction, thereby allowing light diverging in the Y-axis direction to be incident on the reflection block 11 efficiently. The light incident on the incident surface 17 is propagated in the X-axis positive direction and incident on the total reflection surface 18 while totally reflected inside the reflection block 11 as shown in FIG. 5A. The light ray 22 which is parallel to the optical axis from the light source 10 is incident on the total reflection surface 18 of the reflection block 11 at an angle φ. As the incident angle φ to the total, reflection surface 18 is set to the angle θ0 of the reflection block 11 so as to satisfy the total reflection condition, the light ray 22 is totally reflected at the total reflection surface 18, emitted in the Z-axis negative direction and is incident on the light guide plate 8.

The light ray 22 incident on the light guide plate 8 is incident on the prism 15 formed on the bottom surface of the light guide plate 8, namely, on the surface in the Z-axis negative direction. The light emitted from the reflection block 11 will be the light ray slightly inclined to the X-axis positive direction, therefore, the position of the light incident on the light guide plate 8 is a position slightly shifted to the X-axis positive direction from the total reflection surface 18 of the reflection block 11. The prism 15 formed on the light guide plate 8 is arranged so that the total reflection surface 19 of the prism 15 is slightly forward of the total reflection surface 18 of the reflection block 11 in the X-axis positive direction at respective location positions at the time of sliding the light guide plate 8, therefore, the emitted light of the reflection block 11 can be incident on the total reflection surface 19 efficiently.

The inclination angle θ0 of the total reflection surface 18 in the reflection block 11 is approximately the same as the inclination angle θ1 of the total reflection surface 19 of the prism 15, and the surface of the reflection block 11 in the Z-axis direction is parallel to the X-Y plane, namely, the surface of the light guide plate 8 in the Z-axis negative direction, therefore, light incident on the light guide plate 8 is incident on the total reflection surface 19 with approximately the angle φ with respect to the plane normal thereof. Accordingly, the total reflection conditions of the total reflection surface 18 and the total reflection surface 19 are the almost the same, and the light ray 22 is totally reflected at the total reflection surface 19 and propagated in the X-axis direction inside the light guide plate 8.

As the prisms 15 are arranged at respective locating positions of the light guide plate 8, light incident on the light guide plate 8 at each locating position is incident on the slope of θ2 of a next prism 15 in the X-axis positive direction. As the inclination angle θ2 is sufficiently small, light does not go out from the light guide plate 8 by one reflection, however, when the reflection is repeated plural times, the light does not meet the total reflection condition of the light guide plate 8 and the leakage of light occurs. However, the emitted light from the light source 10 is the incoherent light and is not completely parallel light with the divergence of the angle ε. Therefore, the light totally reflected at the total reflection surface 19 of the prism 15 diverges in the X-axis positive direction, and the ratio of the light ray incident on the slope of the angle θ2 of the prism 15 becomes small. As the surface of the prism 15 in the Y-axis direction is reduced in width with the angle θ3 as shown in FIG. 4A, therefore, the ratio of the light ray incident on the slope of the angle θ2 of the prism 15 further becomes small. Accordingly, most of light is propagated, in a space where the prisms 15 of the light guide plate 8 are not arranged and reaches the tip of the light guide plate 8, namely, the prism array 13 formed in the X-axis positive direction.

In FIG. 6C, a light 24 which has reached the prism array 13 is reflected, at the prism array 13 twice, and is emitted out of the light guide plate 8 from the tip inclined surface 14 as shown in FIG. 6A. Part of a light ray 25 reflected on the surface of the tip inclined surface 14 is returned to the prism array 13. The tip inclined surface 14 has an angle with respect to the surface of the light guide plate 8 in the Z-axis positive direction, and the angle θ6 made by the prism array 13 and the tip inclined surface 14 is small, therefore, the light ray 25 is hardly propagated in the X-axis negative direction.

Figure 6D:
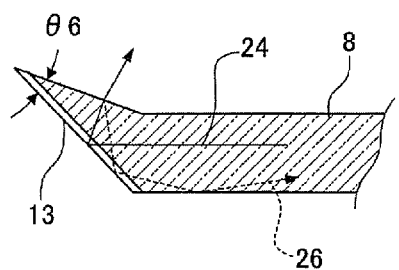
FIG. 6D is a cross-sectional view as a comparative example for explaining a case where a tip inclined surface of the light guide plate does not exist according to the embodiment.

A case where the tip inclined surface 14 does not exist and the angle θ6 is large will be shown in FIG. 6D as a comparative example. When the angle θ6 is large, a light ray 26 reflected on the surface of the light guide plate 8 in the Z-axis positive direction is easily returned in the X-axis negative direction. As shown in FIG. 1, the light returning to the X-axis negative direction is reflected on the total reflection surface of the prism 15 to illuminate the Z-axis direction. Though a rear side of the light source unit 7, namely, the Z-axis negative direction is hidden by the fixed part casing, emitted light from the prisms 15 is seen through the fixed part casing when the transmittance thereof is high, which deteriorates the appearance.

Accordingly, the tip inclined surface 14 is formed in the light guide plate 8 as in the embodiment shown in FIG. 6A, thereby reducing the returned light inside the light guide plate 8, namely, the light ray in the X-axis negative direction and reducing deterioration in appearance. The light with directivity is emitted from the tip inclined surface 14 of the light guide plate 8, and the light is diffused by the light emitting window 9, which realizes indication visually recognized from a wide angle easily.

Next, the leakage of light occurring when the light guide plate 8 is scratched will be explained.

Concerning a scratch in parallel to the light propagation direction inside the light guide plate 8, namely, in the X-axis direction has a small influence as the propagation light of the light guide plate 8 is hardly incident on the scratched surface. On the other hand, a scratch in a direction orthogonal to the light propagation direction, namely, in the Y-axis direction is easily emitted out of the light guide plate 8 as light is incident on the scratched, surface and diffused. There is a small amount of light in the center of the Y-Z surface of the light guide plate 8 as the prisms 15 are arranged, and there is much propagation of light inside the light guide plate 8 on both sides, namely, sides close to the moving part casing, therefore, effects by the leakage of light due to the diffusion of light from the light plate 8 can be reduced by reducing scratching on both sides of the light guide plate 8.

In FIG. 2A, the height "s1" of the portion of the moving part casing 5 where the light guide plate 8 is arranged is formed to be higher than the thickness "s2" of the light guide plate 8, thereby allowing the portion where the amount of propagation light is large in the light guide plate 8, namely, the surface in the Z-axis positive direction in the vicinity of both surfaces of the light guide plate 8 in the Y-axis direction to be scratch resistant, which can reduce the leakage of light due to the scratch from the light guide plate 8.

Next, the amount of light emitted from the light emitting window 9 at respective locating positions will be explained.

In a state where the moving part casing 5 is most retracted, the light ray incident from the reflection block 11 and totally reflected on the prism 15 of the light guide plate 8 is directly incident on the prism array 13 formed in the tip of the light guide plate 8 as shown in the uppermost stage of FIG. 7 and the reflection light is emitted from the light emitting window 9 to perform indication lighting. In a state where the moving part casing 5 is extended, since part of light incident on the prism 15 of the light guide plate 8 is emitted out of the light guide plate 8 at portions other than the light emitting window 9 by the prisms 15 arranged in the X-axis positive direction, the light amount emitted from the light emitting window S is reduced.

However, the above problem is improved in the present embodiment by forming the shape of the prisms 15 as shown in FIGS. 4A, 4B and 4C.

That is, the width "v4" of the total reflection surface 19 of the prism 15 formed in the light guide plate 8 in the Y-axis direction is reduced toward the X-axis positive direction of the light guide plate 8 so that the area of the total reflection surfaces 19 becomes small toward the X-axis positive direction, thereby reducing the light amount propagated to the X-axis positive direction of the light guide plate 8. Therefore, most of the light incident from the total reflection surface of the reflection block 11 is reflected on the total reflection surface 19 in the state where the moving part casing 5 and the light guide plate 8 are extended, however, the amount of light which is reflected on the total reflection surface 19 in the light incident from the total reflection surface of the reflection block 11 is reduced, in the state where the moving part casing 5 and the light guide plate 8 are retracted, thereby emitting the same degree of light from the light emitting window 9 at any locating position.

When the above structure is adopted, the light from the light source with high directivity arranged in the fixed part is collected by the reflection block 11 and emitted from the total reflection surface 18 in the Z-axis negative direction. The light is propagated with high efficiency by total reflection on the prisms 15 in the light guide plate formed at positions corresponding to locating positions in the moving part and emitted from the light guide plate 8 and the light emitting window 9 arranged at the tip of the light guide plate 8 to thereby perform indication display.

The light is transmitted to the light emitting window 9 arranged in the moving part casing 5 which can be extended/retracted from the fixed part casing 4 by light transmission using the light guide plate 8 as described above, therefore, electric wiring for indication lighting is not necessary between the fixed part casing 4 and the moving part casing 5. Accordingly, the number of wiring between the fixed part casing 4 and the moving part casing 5 can be reduced, the wiring width of a flexible wiring to the moving part casing 5 can be reduced, and widths of the fixed part casing 4 as the extension tube and the moving part casing 5 as the extension tube are reduced, thereby reducing the weight. Furthermore, the light guide plate 8 can be also lit up, which improves visibility of indication lighting.

As the reflection block 11 is used, the light is emitted from the light source 10 in the X-axis direction as compared with a case where the optical axis of the light source 10 is arranged approximately in parallel to the z-axis. As the light source 10 and the reflection block 11 are sequentially arranged in the X-axis direction to thereby allow the light to be almost perpendicular to the incident surface of the light guide plate 8, the thickness in a direction perpendicular to the moving direction of the moving part casing 5 can be reduced to a degree corresponding to a diameter of the light source 10 or the thickness of the reflection block 11 in addition to the thickness of the light guide plate 8.

Additionally, the prism 15 formed in the lower surface of the light guide plate 8 is formed so that the width of the total reflection surface 19 is reduced as approaching the light emitting window 9, thereby performing indication lighting with less variation in light amount of indication at any locating position.

As the light is transmitted by the light guide plate 8, the light is transmitted to the light emitting window 9 by the total reflection inside the light guide plate 8 to perform indication lighting even when a slight curvature occurs due to "warping" and the light guide plate 8 is deformed when a force is added to the moving part casing 5.

As the light is transmitted by the large total reflection surfaces 19 formed in the lower surface of the light guide plate 8 from the light source 10 arranged in the fixed part casing 4, the light can be transmitted almost without loss of light even when some backlash occurs in the moving part casing 5.

The light source 10 may include plural LED chips emitting light having plural wavelengths so as to switch the light emission wavelength.

The light emitting window 9 is formed to be transparent, but and the light emitting window 9 may be colored to slightly reduce the transmittance though, the indication becomes dark, thereby reduce effects of outer light.

It is also preferable that a transparent protective layer for preventing a scratch is formed on the light guide plate 8. Alternatively, a thin transparent sheet may be disposed.

Although the light guide plate 8 is formed in the rectangular parallelepiped shape the cross section of which is the rectangular shape, it is also preferable that the cross section is a circular or an extrusion shape having a free-form surface as long as the shape in which light can be propagated, by shutting in the light by the total reflection is adopted. The leakage of light is increased when light guide plate 8 is sharply folded, however, a gentle curvature may be formed in the light guide plate 8 in the X-axis direction within a range in which the total reflection, of light can be kept.

Figure 8:
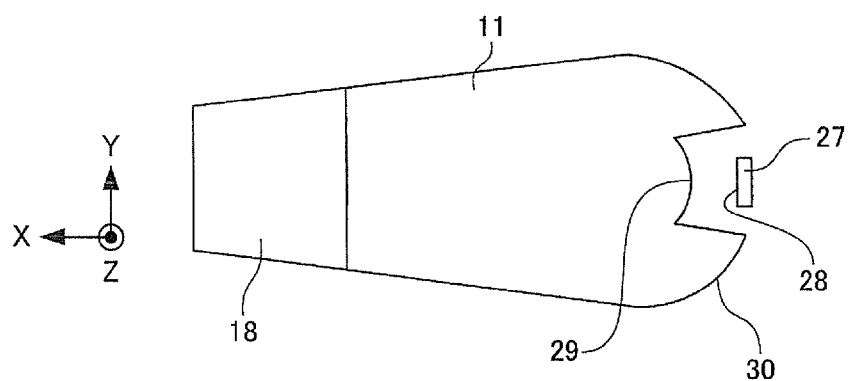
FIG. 8 is a plan view of the reflection block when a chip-type LSD is used as the light source according to the embodiment.

Although the shell-type LED with high directivity is used as the light source 10, a chip-type LED 27 may be used as shown in FIG. 8. As a diverging angle of emitted light from a light emitting surface 28 of the chip-type LSD 27 is large, a transmissive lens 29 is arranged in the incident surface 17 of the reflection block 11 in the LED 27 side just above the chip-type LED 27 in the X-axis direction, allowing light emitted from the chip-type LED 27 to be parallel. On both sides of the transmissive lens 29 in the Y-axis direction, total reflection lenses 30 are arranged, allowing light diverging and emitted from the chip-type LED 27 to be incident on the reflection block 11 and to be a luminous flux close to the parallel light in the X-axis direction.

Figure 9A:
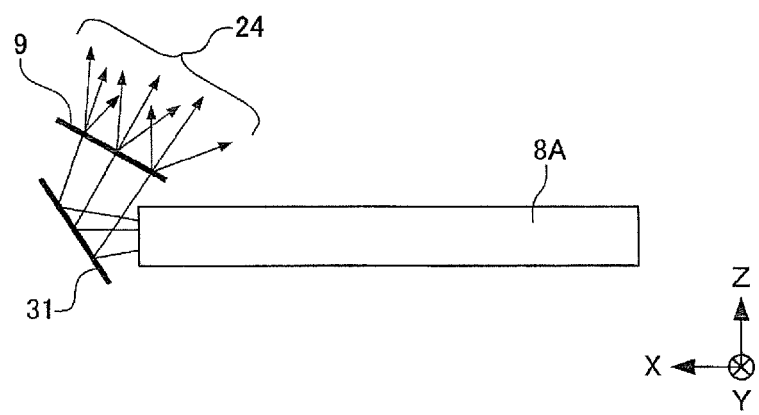
FIG. 9A is a side view of a first example in which a light guide plate having a different tip shape is used instead of the above light guide plate.
Figure 9B:
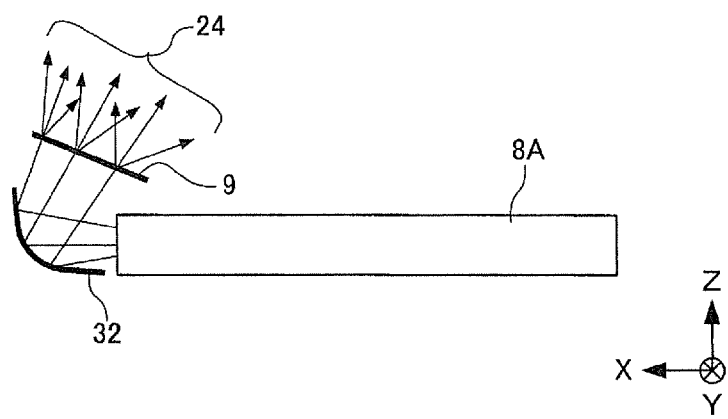
FIG. 9B is a side view of a second example in which the light guide plate having a different tip shape is used instead of the above light guide plate and FIG. 9C is a side view of a third example in which the light guide plate having a different tip shape is used instead of the above light guide plate according to the embodiment.
Figure 9C:
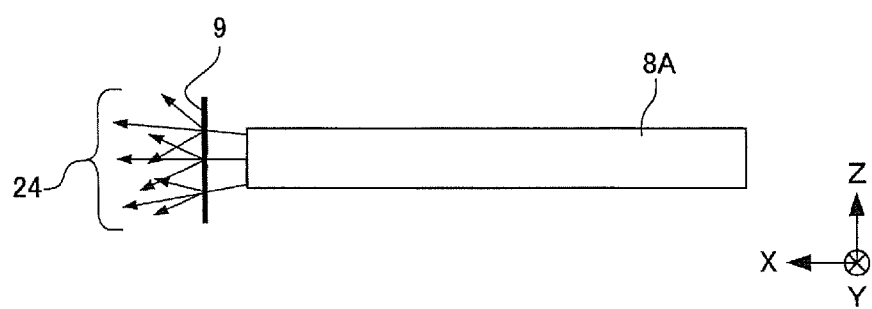

Although the prism array 13 is provided in the tip of the light guide plate 8 and the propagated light in the light guide plate 8 is reflected on the prism array 13 to be emitted from the tip inclined, surface 14 and emitted outside through the light emitting window 9, it is possible to configure the device as shown in FIG. 9A, 9B or 9C.

In a case of FIG. 9A, a tip of the light guide plate 8 is formed to be a flat surface parallel to the Y-X plane which is shown in a light guide plate 8A. A reflection mirror 31 is disposed at the tip thereof, and light is emitted from the light guide plate 8A in the X-axis positive direction and a direction of the light emitted from the light guide plate 8A is changed to the Z-axis direction by the reflection mirror 31, then, the light is emitted from the light emitting window 9. In a case of FIG. 9B, a reflection block 32 with high diffusibility is arranged at a tip portion of the light guide plate 8A. The number of components is increased, however, light can be uniformly seen from any direction by diffusing light emitted from the light guide plate 8A once. Although the emitted light from the light guide plate 8A is directed to the Z-axis positive direction in FIGS. 9A and 9B, it is also possible to change positions of the prism array 13 and the tip inclined surface 14 of the light guide plate so that the light is emitted in the Z-axis negative direction. It is also preferable that light is emitted from the tip of the light guide plate 8A in the X-axis direction as shown in FIG. 9C.

Figure 10A:
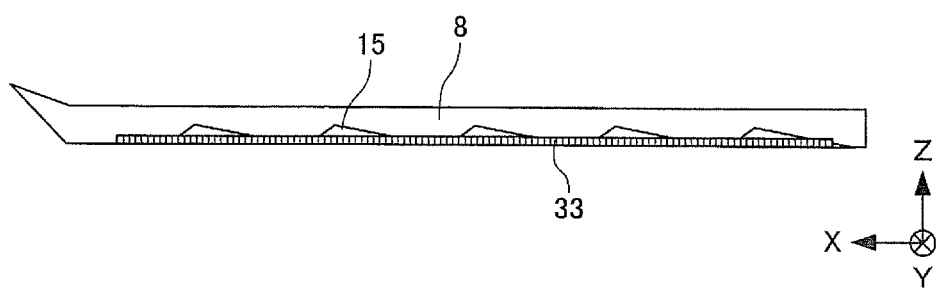
FIG. 10A is a side view showing a case where prism arrays for decoration lighting are formed on side surfaces of the light guide plate and FIG. 10B is an enlarged cross-sectional view showing a case where the prism arrays for decoration lighting are formed on the side surfaces of the light guide plate according to the embodiment.
Figure 10B:
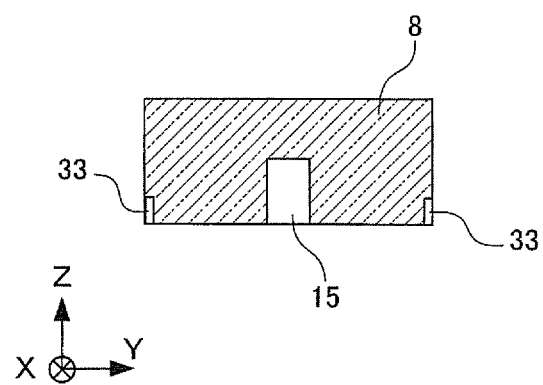
Figure 11A:
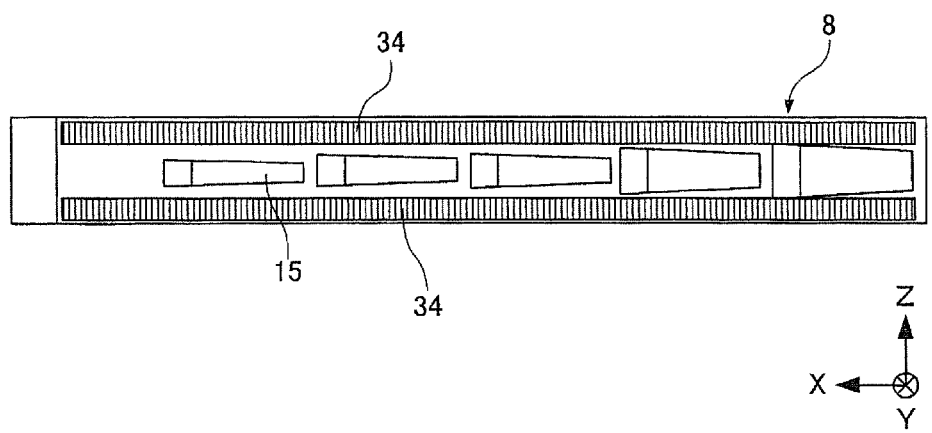
FIG. 11A is a side view showing a case where prism arrays for decoration lighting are formed on a lower surface of the light guide plate and FIG. 11B is an enlarged cross-sectional view showing a case where the prism arrays for decoration lighting are formed on the lower surface of the light guide plate according to the embodiment.
Figure 11B:
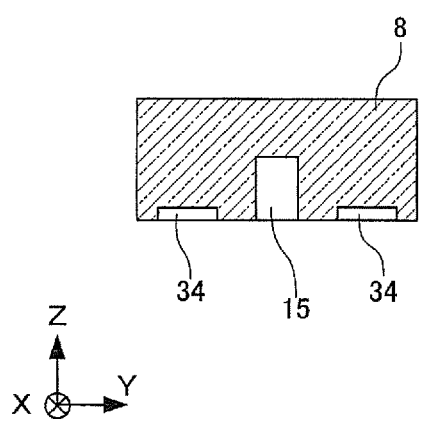

The light guide plate 8 according to the respective embodiments may be provided with prism arrays 33 and 34 for decoration lighting as shown in FIGS. 10A and 10B as well as FIGS. 11A and 11B.

In a case of FIGS. 10A and 10B, the arrays 33 of small prisms are arranged in both side surfaces of the light guide plate 8 in the Y-axis direction, and part of light propagated inside the light guide plate 8 is scattered by the prism arrays 33 to thereby faintly light the light guide plate 8 itself. As the prism arrays 33 are formed on both surfaces of the light guide plate 8 in the Y-axis direction, the prism arrays 33 are not directly seen from the Z-axis direction and light emitted from the prism arrays 33, abutting on the moving part casing 5 and diffused is seen, therefore, the light guide plate 8 can be illuminated with light soft to the eye in which only the presence of light can be felt while suppressing glare.

In a case of FIGS. 11A and 11B, prism arrays 34 are formed on a surface of the light guide plate 8 in the Z-axis negative direction. As the prism arrays 34 are formed on the surface of the light guide plate 8 in the Z-axis negative direction, reflected light from the prism arrays 34 can be directly seen from the Z-axis direction, therefore, strong glittering light can be formed.

The cross-sectional shapes of the prism arrays 33 and 34 may be shapes of triangular, trapezoid, arc, conic, pyramid and spherical dots as long as prism, arrays can scatter the light. It is also preferable that the prism array 33 is formed on the surface of the light guide plate 8 in the Y-axis direction and the prism array 34 is formed in the surface of the light guide plate 8 in the Z-axis direction.

Figure 12:
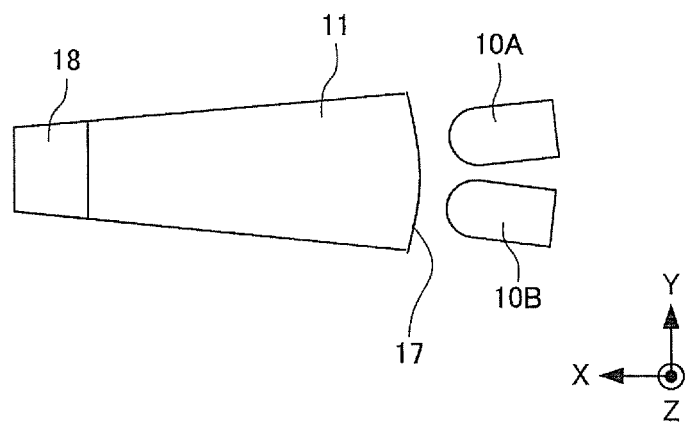
FIG. 12 is a plan view of the light source unit showing a case where two light sources are arranged instead of one light source according to the embodiment.

Although one light source 10 is used in the respective embodiments, two light sources 10A and 10B may be arranged as shown in FIG. 12 to increase the amount of light.

Although the incident surface 17 of the reflection block 11 is the anamorphic curved surface in the respective embodiments, it is also possible to adopt a flat surface which can be easily processed though the condensing efficiency is reduced.

Although the light emitting window 9 is formed to be transparent in the respective embodiments, it is also possible to form the light emitting window 9 using a material which slightly absorbs light to prevent lighting inside the light guide plate 8 due to outside light though the indication becomes dark.

Figure 13:
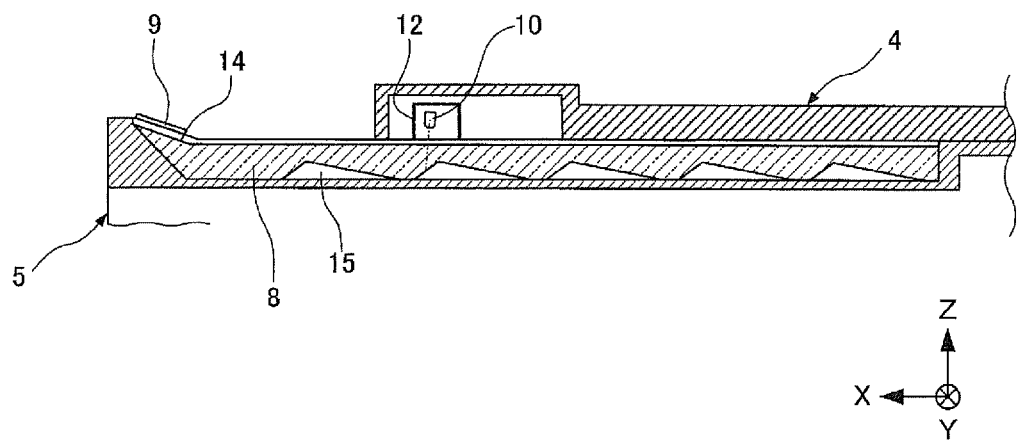
FIG. 13 is a cross-sectional view showing a case where the reflection block is not provided according to the embodiment.

Although the height of the light source unit 7 in the Z-axis direction is reduced by setting the light emission direction of the light source 10 to the X-axis direction and folding the light ray back in the Z-axis negative direction on the total reflection surface 18 of the reflection block 11 in the respective embodiments, it is also preferable that the optical axis of the light source 10 is set to the Z-axis negative direction and that light is directly incident on the prism 15 of the light guide plate 8 without using the reflection block 11 as shown in FIG. 13 if the height of the light source unit 7 may be increased.

Although the surface on which the prisms 15 are formed in the light guide plate 8, namely, the surface in the Z-axis negative direction is formed to be transparent to realize total reflection in the respective embodiments, the surface may be a mirror surface on which a reflective film made of aluminum and the like is deposited though the reflectance is reduced.

Although the prisms 15 of the light guide plate 8 are provided in one row in the Y-axis direction in the respective embodiments, the prisms 15 may be provided in plural rows though the optical efficiency is reduced.

Although the width of the prism 15 is narrowed toward the X-axis positive direction in the respective embodiments, the same effects can be obtained when the area of the total reflection surface 19 in the Y-Z cross section of the light guide plate 8 is reduced.

Figure 14A:
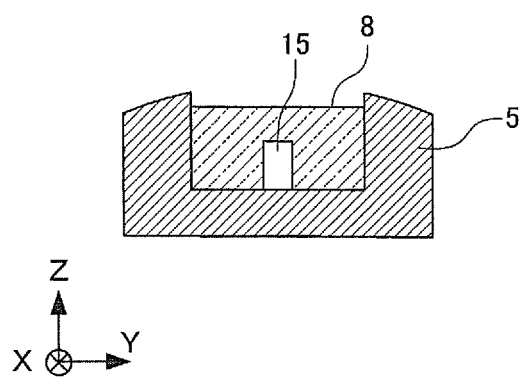
FIG. 14A is a cross-sectional view showing a case where part of the light guide plate is changed to a curved surface shape and FIG. 14B is a cross-sectional view showing a case where part of an upper surface of the light guide plate is covered with the moving part casing according to the embodiment.
Figure 14B:
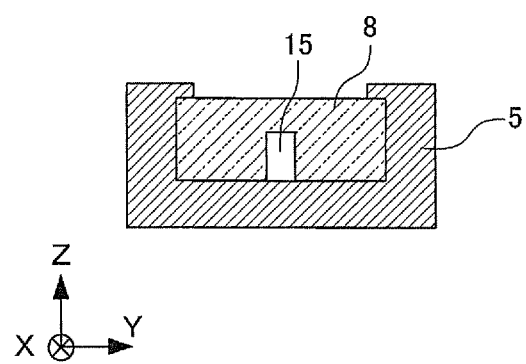

Although the Y-Z cross section of the light guide plate 8 is the rectangular parallelepiped shape as shown in FIGS. 2A and 2B, the present invention is not limited to this. For example, it is also preferable that an upper surface of the light guide plate 8 has a curved surface shape as shown in FIG. 14A. It is further preferable that part of the upper surface of the light guide plate 8 is surrounded by the moving part casing 5 as shown in FIG. 14B to protect and fix the light guide plate 8.

The case where the indication lighting device is provided in the extension tube of the vacuum cleaner has been explained as the example in the respective embodiments, however, the indication lighting device can be assembled in the same manner to other electric appliances in which the moving part which can be stopped at plural locating positions with respect to the fixed part is formed. Accordingly, the cross-sectional shapes of the fixed part and the moving part have the tubular shape, however, the cross-sectional shape of the moving part casing 5 as the moving part in which the light guide plate 8 as the optical waveguide is arranged is not limited to the tubular shape.

The indication lighting device according to the exemplary embodiments can be applied to an indication device of a vacuum cleaner or other electric appliances in which the moving part which can be stopped at plural locating positions with respect to the fixed part is formed.

What is claimed is:

1. A vacuum cleaner comprising:
a cleaner main body provided with a motor which generates vacuum force;
an extension tube including a hollow fixed part casing and a hollow moving part casing that can extend from the fixed part casing at plural locating positions to transmit the vacuum force to a nozzle;
a light source arranged in the fixed part casing and emitting light;
an optical waveguide arranged in the moving part casing, the optical waveguide including a plurality of prisms formed at intervals corresponding to the plural locating positions of the moving part casing for propagating the light emitted from the light source; and
a light emitting window formed on a lower part of the moving part casing, the light emitting window serving as an indication part and arranged to emit light propagated inside the optical waveguide to show a cleansing state,
wherein the optical waveguide includes a tip inclined surface formed in a tip thereof in an elongated direction of the moving part casing and a prism array on the tip inclined surface to reflect the light propagated inside the optical waveguide to the light emitting window.

* * * * *